United States Patent [19]

Ciolli

[11] 3,904,894

[45] Sept. 9, 1975

[54] CIRCUIT FOR PRODUCING AN OUTPUT SIGNAL DURING THE PERIOD BETWEEN THE PULSES OF REPEATING TIME DISPLACED PULSE PAIRS

[75] Inventor: Henry J. Ciolli, Utica, Mich.

[73] Assignee: General Motors Corporation, Detroit, Mich.

[22] Filed: July 24, 1974

[21] Appl. No.: 491,281

[52] U.S. Cl. ................ 307/260; 307/232; 307/233; 307/262; 307/265; 307/273; 307/271; 307/278; 328/58; 328/61; 328/133

[51] Int. Cl.²... H03K 4/00; H03K 3/10; H03K 1/16

[58] Field of Search ........... 307/232, 233, 260, 262, 307/271, 273, 278, 265; 328/59, 60, 61, 73, 307/58, 133, 191-192, 209

[56] References Cited

UNITED STATES PATENTS

| | | | |
|---|---|---|---|
| 3,067,343 | 12/1962 | Roscoe | 307/260 |
| 3,443,232 | 5/1969 | Stinson, Jr. | 307/265 |
| 3,473,130 | 10/1969 | Briggs | 328/109 |
| 3,489,925 | 1/1970 | Bjerke | 307/260 |
| 3,854,103 | 12/1974 | Takarada | 307/260 |

*Primary Examiner*—Stanley D. Miller, Jr.
*Attorney, Agent, or Firm*—Richard G. Stahr

[57] ABSTRACT

A start signal monostable multivibrator circuit produces a start output signal in response to each of the first occurring pulses and a stop signal monostable multivibrator circuit produces a stop output signal in response to each of the later occurring pulses of repeating time displaced pulse pairs. A bistable multivibrator circuit is responsive to each start signal for initiating and to each stop signal for terminating the system direct current output signal. A direct current potential modulation signal proportional to the frequency of the later occurring pulses is developed and a disenabling monostable multivibrator circuit is responsive to the modulation signal for producing an output disenabling signal which disenables the start signal monostable multivibrator circuit for a predetermined period of time during the period between successive first occurring pulses of repeating time displaced pulse pairs.

8 Claims, 2 Drawing Figures

Figure 1:
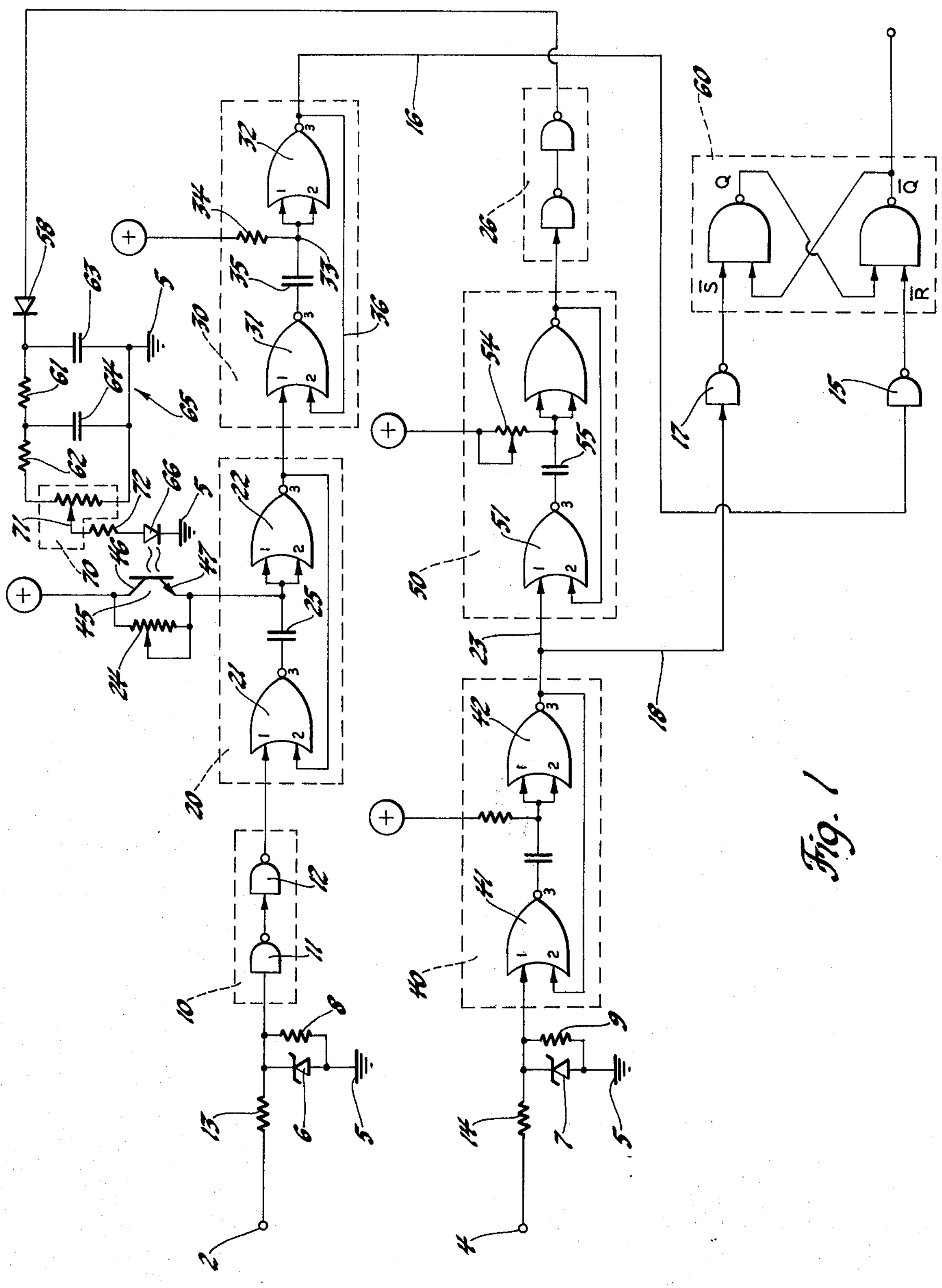

CIRCUIT FOR PRODUCING AN OUTPUT SIGNAL DURING THE PERIOD BETWEEN THE PULSES OF REPEATING TIME DISPLACED PULSE PAIRS

This invention is directed to a circuit for producing an output signal during the period between the pulses of repeating time displaced pulse pairs and, more specifically, to a circuit of this type which provides a disenabling signal for a predetermined portion of the period between successive first occurring pulses of repeating pulse pairs.

There are many applications which require a circuit capable of producing an output signal during the period between the pulses of repeating time displaced pulse pairs. Prior art circuits of this type employ a flip-flop or bistable multivibrator circuit responsive to each of the first occurring pulses of repeating time displaced pulse pairs for initiating and to each of the later occurring pulses for terminating a direct current output signal of a pulse width equal to the duration of time between the first and later occurring pulses of each pulse pair. These circuits have proved to be unsatisfactory in that they are sensitive to spurious or transient signals and, consequently, may initiate and/or terminate the system direct current output signal in response to transient signals rather than the first and later occurring pulses of the repeating pulse pairs. Therefore, a circuit of this type which provides a disenabling signal during a predetermined portion of the period between successive first occurring pulses of repeating pulse pairs for rendering the circuit virtually noise immune is desirable.

It is, therefore, an object of this invention to provide an improved circuit for producing an output signal during the period between the pairs of repeating time displaced pulse pairs.

It is another object of this invention to provide an improved circuit for producing an output signal during the period between the pulses of repeating time displaced pulse pairs having a disenabling feature which disenables the circuit for a predetermined portion of the period between successive first occurring pulses of the repeating pulse pairs.

In accordance with this invention, a circuit for producing an output signal during the period between the pulses of repeating time displaced input signal pulse pairs is provided wherein respective monostable multivibrator circuits produce start and stop output signal pulses in response to the first and later occurring input signal pulses of repeating time displaced pulse pairs which, respectively, trigger a bistable mutlivibrator circuit to initiate and terminate the system direct current output signal and a disenabling monostable multivibrator circuit is responsive to a direct current modulating potential of a level proportional to the frequency of the stop signals to produce an output signal which disenables the start signal monostable multivibrator circuit for a predetermined period of time between successive first occurring input signal pulses of the repeating input signal pulse pairs.

Figure 2:
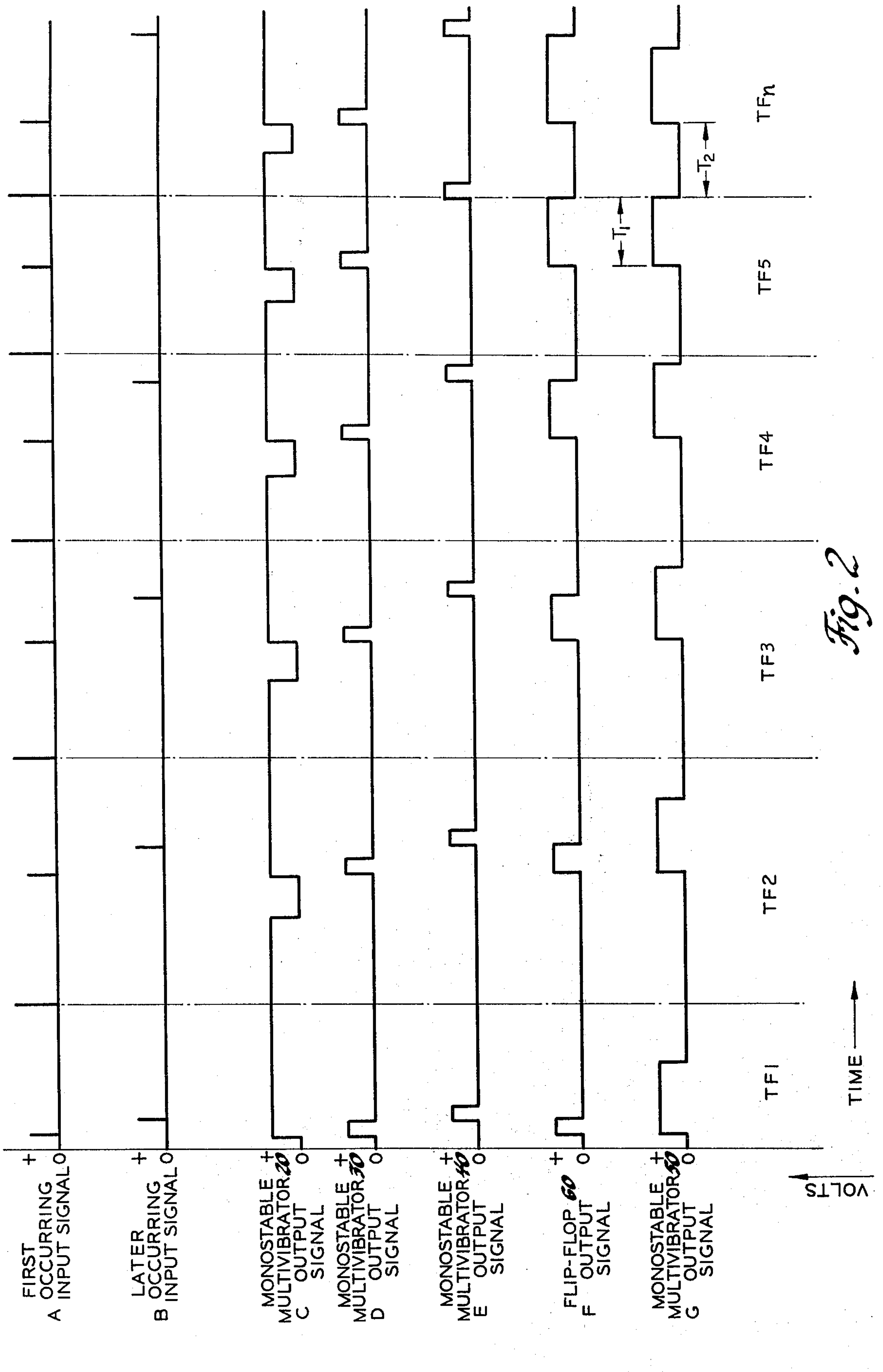

For a better understanding of the present invention, together with additional objects, advantages and features thereof, reference is made to the following description and accompanying drawings in which:

FIG. 1 is a circuit diagram of the novel circuit of this invention in schematic form; and FIG. 2 is a set of curves useful in understanding the circuit of FIG. 1.

One specific application of a circuit for producing an output signal during the period between the pulses of repeating time displaced input signal pulse pairs is an electronic spark angle protractor which indicates directly on an electrical meter the number of degrees of internal combustion engine crankshaft rotation between the spark plug ionization or the ignition spark and the top dead center position of the respective piston or rotor of the engine. Without intention or inference of a limitation thereto, the following explanation of the novel circuit of this invention will be in regard to an electronic spark angle protractor.

In FIG. 1 of the drawing, point of reference or ground potential has been represented by the accepted schematic symbol and referenced by the numeral 5.

It is to be specifically understood that the operating potential required for the novel circuit of FIG. 1 may be supplied by any well known direct current power supply or by a battery having an output potential compatible with the several circuit elements, for example 12 volts. In the interest of reducing drawing complexity and since any direct current power source well known in the art may be employed, the source of operating potential has not been illustrated in FIG. 1. It is to be understood, however, that all of the points in the circuit indicated by a circled plus sign are connected to the positive polarity output terminal and point of reference or ground potential 5 is connected to the negative polarity output terminal of the selected source of operating potential.

The repeating time displaced input signal pulse pairs are diagrammatically set forth in FIG. 2, wherein the vertical axis is volts and the horizontal axis is time, the first occurring input signal pulses being illustrated by curve A and the later occurring input signal pulses being illustrated by curve B. The first occurring input signal pulse of curve A and the time displaced later occurring input signal pulse of curve B in each of time frames TF1, TF2, TF3, TF4, TF5 and TFnth is in input signal pulse pair. As indicated in FIG. 2, these pulse pairs repeat through the several time frames. Curves A and B of FIG. 2 indicate an increase of frequency of the input signal pulse pairs from left to right, as looking at the FIGURE, and also an increase of the period between the first and second occurring input signals of each pulse pair. In a practical application of the circuit of this invention, the first occurring input signal pulse of each repeating input signal pulse pair was initiated by the ignition spark and the later occurring input signal pulse was a signal obtained through a magnetic pickup device indicating the top dead center position of the cylinder of the engine to which the spark energy was directed. The first occurring and the later occurring input signal pulses of the repeating input signal pulse pairs may be applied to the novel circuit of this invention through input circuitry provided therefor which may be respective input terminals 2 and 4 or any other electrical element or device suitable for connection to external circuitry. Respective Zener diodes 6 and 7 limit the input signals to a magnitude compatible with the circuit elements to which they are applied and respective resistors 8 and 9 are load resistors.

The novel circuit of this invention operates in response to logic signals to produce the desired results. In accordance with logic circuit terminology well known in the art, throughout this specification, the logic signals will be referred to as "high" or logic 1 and "low" or logic 0 signals. For purposes of this specification, and without intention or inference of a limitation thereto, the high or logic 1 signals will be considered to be of a positive polarity potential and the low or logic 0 signals will be considered to be of zero or ground potential.

In FIG. 1 of the drawing, circuit elements referenced by the numerals 20, 30, 40, and 50 are monostable multivibrator circuits, each employing two commercially available NOR gate circuits. The NOR gate is a well known circuit element commonly employed in logic circuit applications. As is well known in the logic circuit art, the NOR gate produces a logic 1 output signal with a logic 0 signal present upon all of the input terminals and a logic 0 output signal with a logic 1 signal present upon one or more of the input terminals. A monostable multivibrator circuit is a well known logic circuit element having input and output circuits and a timing capacitor which is electrical pulse triggerable from a stable condition of operation, in which a logic 0 signal is present upon the output terminal, to an alternate condition of operation, in which a logic 1 signal is present upon the output terminal, and which, upon being triggered to the alternate condition of operation, spontaneously returns to the stable condition of operation at the conclusion of a period of time determined by the R-C time constant of the charge circuit of the timing capacitor.

The monostable multivibrator circuits employed in a practical application of the novel circuit of this invention will be explained in regard to monostable multivibrator circuit 30. In the stable condition of operation with a positive polarity potential applied to junction 33 through charge circuit resistor 34, a logic 0 signal is present upon the output terminal of the monostable multivibrator device, output terminal 3 of gate 32. This logic 0 signal is fed back to input terminal 2 of gate 31 through lead 36, consequently, a logic 1 signal is present upon output terminal 3 of gate 31. With a logic 1 signal present upon output terminal 3 of gate 31, timing capacitor 35 has the supply potential applied to both plates thereof, consequently, timing capacitor 35 does not charge. Upon the application of a logic 1 input signal to input terminal 1 of gate 31, a logic 0 signal appears upon output terminal 3 of gate 31, the output transistor device of gate 31 being conductive. With a logic 0 signal present upon output terminal 3 of gate 31, timing capacitor 35 begins to charge through the timing capacitor charge circuit which may be traced from the positive polarity terminal of the source of operating potential, through charge circuit resistor 34, timing capacitor 35, the current carrying electrodes of the output transistor of gate 31 and point of reference or ground potential 5 to the negative polarity terminal of the source of operating potential. Upon the initiation of the charge of timing capacitor 35, the potential upon junction 33 is substantially ground and, as timing capacitor 35 charges, the potential of junction 33 becomes more positive. While the potential upon junction 33 is of a magnitude less than the trigger level of gate 32, this potential serves as a logic 0 signal and is applied to both input terminals 1 and 2 of gate 32 which, therefore, produces a logic 1 signal upon output terminal 3 thereof. Consequently, upon the application of a logic 1 signal to input terminal 1 of gate 31, the device is electrical pulse triggered to the alternate condition of operation with a logic 0 signal upon the output terminal thereof, output terminal 3 of gate 32. This logic 1 signal is fed back through lead 36 to input terminal 2 of gate 31 which maintains the device in the alternate condition of operation after the logic 1 input signal pulse has been removed from input terminal 1 of gate 31. When timing capacitor 35 has become charged to a level at which the potential upon junction 33 is of a magnitude equal to the trigger level of gate 32, this potential serves as a logic 1 signal and is applied to both input terminals 1 and 2 of gate 32 which, therefore, produces a logic 0 signal upon output terminal 2 thereof. The device, therefore, has spontaneously returned to the stable condition of operation. The period of time that monostable multivibrator circuits of this type remain in the alternate condition of operation is determined by the R-C time constant of the charge circuit of the timing capacitor. That is, an increase of the ohmic value of the charge circuit resistor will increase the period of time the monostable multivibrator circuit remains in the alternate condition of operation and vice versa.

The first occurring input signal pulses are applied to input circuit terminal 2 and are directed through current limiting resistor 13 to the input terminal of a wave shaper circuit 10. The later occurring input signal pulses are applied to input circuit terminal 4 and are directed through current limiting resistor 14 to the input terminal of monostable multivibrator circuit 40, input terminal 1 of gate 41. In a practical application of the circuit of this invention, the first occurring input signal pulses were produced by the ignition spark of an internal combustion engine and the later occurring input signal pulse were produced by a magnetic pickup arrangement. As the signals produced by the ignition spark were of an unacceptable wave form, it was necessary to shape these input signal pulses to sharp square wave form pulses. Therefore, a wave shaper circuit was employed. The later occurring input signal pulses produced by the magnetic pickup arrangement were of an acceptable wave form, consequently, a wave shaper circuit for these signals was not required. It is to be specifically understood that the wave shaper circuit is not absolutely necessary to the invention as there may be applications which do not require a wave shaper circuit. There may be other applications which require a wave shaper circuit for both the first and later occurring input signal pulses of the input signal pulse pairs and there may be other applications which require a wave shaper circuit for only one or the other of the input signal pulse pairs. Wave shaper circuit 10 is illustrated in FIG. 1 as two series connected logic inverter circuit elements 11 and 12. Each of inverter circuits 11 and 12 may be of the type well known in the logic circuit art which inverts either logic signal applied to the input terminal to the other logic signal upon the output terminal. Inverter circuit 11 inverts each first occurring logic 1 input signal pulse to a logic 0 output signal pulse and inverter circuit 12 inverts the logic 0 output signal pulse of inverter circuit 11 to a logic 1 output signal pulse. It is to be specifically understood that any one of the many other wave shaper circuits well known in the logic circuit art which provide a sharp, square wave output signal may be employed to shape either or both of the repeating input signal pulse pairs as required without departing from the spirit of the invention.

Each shaped first occurring input signal pulse, applied to the input terminal of monostable multivibrator circuit 20, input terminal 1 of gate 21, triggers monostable multivibrator circuit 20 to the alternate condition of operation in which a logic 1 signal is present upon the output terminal thereof, output terminal 3 of gate 22. Monostable multivibrator circuit 20 is a disenabling monostable multivibrator, the purpose and specific function of which will be explained in detail later in this specification. The logic 1 signal present upon the output terminal of monostable multivibrator circuit 20 is applied to the input terminal of start signal monostable multivibrator circuit 30, input terminal 1 of gate 31, to trigger this device to the alternate condition of operation. While in the alternate condition of operation, a logic 1 "start" signal is present upon the output terminal thereof, output terminal 3 of gate 32, as shown by curve D of FIG. 2. In a practical application of the circuit of this invention, the start output signal pulses produced by monostable multivibrator circuit 30 were of a 10 microseconds duration. The logic 1 start signal pulse produced by monostable multivibrator 30 is applied through lead 16 to the input terminal of a conventional inverter circuit 15, which may be of the same type as inverter circuits 11 and 12. Inverter circuit 15 inverts the logic 1 input signal to a logic 0 signal upon the output terminal thereof which is applied to the $\overline{R}$ input terminal of RS flip-flop circuit 60. It is to be specifically understood that any one of the many bistable multivibrator circuits may be substituted for RS flip-flop circuit 60 without departing from the spirit of the invention. The RS flip-flop circuit is a logic circuit element well known in the art which produces a logic 0 signal upon the $\overline{Q}$ output terminal upon the application of a logic 0 signal to the $\overline{S}$ input terminal and a logic 1 signal upon the $\overline{Q}$ output terminal upon the application of a logic 0 signal to the $\overline{R}$ input terminal. Consequently, in response to the logic 0 signal applied to the $\overline{R}$ input terminal, RS flip-flop circuit 60 produces a logic 1 output signal upon the $\overline{Q}$ output terminal thereof, curve F of FIG. 2.

Each later occurring input signal pulse, applied to the input terminal of monostable multivibrator circuit 40, input terminal 1 of gate 41, triggers monostable multivibrator circuit 40 to the alternate condition of operation. While in the alternate condition of operation, a logic 1 "stop" signal is present upon output terminal thereof, output terminal 3 of gate 42, as shown by curve E of FIG. 2. In a practical application of the circuit of this invention, the stop output signal pulses produced by monostable multivibrator circuit 40 was of 10 microseconds duration. The logic 1 signal pulse produced by monostable multivibrator circuit 40 is applied through lead 18 to the input terminal of a conventional inverter circuit 17 which may be of the same type as inverter circuits 11 and 12. Inverter circuit 17 inverts the logic 1 input signal to a logic 0 signal upon the output terminal thereof which is applied to the $\overline{S}$ input terminal of RS flip-flop circuit 60. Consequently, in response to this logic 0 signal applied to the $\overline{S}$ input terminal, RS flip-flop circuit 60 produces a logic 0 signal upon the $\overline{Q}$ output terminal thereof, curve F of FIG. 2. From this description, it is apparent that RS flip-flop circuit 60 is responsive to each of the start signals for initiating and to each of the stop signals for terminating the system direct current output signal.

To render the novel circuit of this invention virtually immune to transient electrical signals or electrical noise, a circuit which disenables start signal monostable multivibrator circuit 30 during the period between successive first occurring input signal pulses of the repeating input signal pulse pairs is provided for the purpose of blanking any electrical transient pulses or noise which may appear upon input circuit terminal 2 between successive first occurring input signal pulses of the repeating input signal pulse pairs.

The output terminal of stop signal monostable multivibrator circuit 40, output terminal 3 of gate 42, is connected, through lead 23, to the input terminal of monostable multivibrator circuit 50, input terminal 1 of gate 51. Consequently, each logic 1 stop signal pulse produced by stop signal monostable multivibrator circuit 40 triggers monostable multivibrator circuit 50 to the alternate condition of operation. The maximum frequency of the stop signal pulses is determined and variable charge circuit resistor 54, connected in series in the charge circuit of timing capacitor 55 of monostable multivibrator circuit 50, is adjusted to the ohmic value at which monostable multivibrator circuit 50 remains in the alternate condition of operation for one-half the period of time between stop signal pulses. That is, at the maximum frequency of the stop signal pulses produced by monostable mulitvibrator circuit 40, the "on" time of the output signal is equal to the "off" time. This is indicated at the high frequency end of curve G of FIG. 2 wherein the on time, $T_1$, is equal to the off time, $T_2$. In the practical application of the circuit of this invention, with an eight cylinder internal combustion engine, there were four later occurring input signal pulses for each pulse pair and four stop signal pulses per engine revolution. At 6000 RPM, the period of time between stop pulses was $2.5 \times 10^{-3}$ seconds. Therefore, monostable multivibrator circuit 50 was adjusted to remain in the alternate condition of operation for $1.25 \times 10^{-3}$ seconds. Each logic 1 stop signal pulse produced by monostable multivibrator circuit 40 triggers monostable multivibrator circuit 50 to the alternate condition of operation in which it remains until timing capacitor 55 has become charged. When capacitor 55 has become charged, monostable multivibrator circuit 50 spontaneously returns to the stable condition of operation. Consequently, monostable multivibrator circuit 50 is responsive to each logic 1 stop signal pulse produced by stop signal monostable multivibrator circuit 40 for producing a series of constant pulse width output signal pulses of a frequency equal to the frequency of the logic 1 stop signal pulses. This is best illustrated by curve G of FIG. 2.

The series of constant pulse width output signal pulses produced by monostable multivibrator circuit 50 may be squared by a conventional pulse shaper circuit 26 which may be the same as wave shaper circuit 10. It is to be specifically understood that wave shaper circuit 26 is not absolutely necessary, however, if required, alternate wave shaper circuits may be employed without departing from the spirit of the invention.

The series of constant pulse width output signal pulses are applied through diode 58 to a Pi section filter 65 comprised of series resistors 61 and 62 and parallel capacitors 63 and 64. The Pi section filter circuit averages the series of constant pulse width output signal pulses from monostable multivibrator circuit 50 to produce a modulation signal of a direct current potential level proportional to the frequency of the later occurring input signal pulses of the repeating input signal pulse pairs. It is to be specifically understood that other well known electrical pulse averaging circuits may be substituted for the Pi section filter 65 without departing from the spirit of the invention.

This direct current modulation signal is impressed across light emitting diode 66 through movable contact 71 of a potentiometer 70 and series resistor 72.

Light emitting diode 66 is photocoupled to a phototransistor 45 having a collector electrode 46 and an emitter electrode 47. The parallel combination of the collector-emitter electrodes of phototransistor 45 and variable charge circuit resistor 24 is connected in series in the charge circuit of timing capacitor 25. Phototransistor 45 may be any one of the many phototransistors commercially available and well known in the art which, with an increase of incident light, increases collector-emitter conduction therethrough. As the potential level of the direct current modulation signal is increased with an increase of frequency of the later occurring input signal pulses of the repeating input signal pulse pairs, the light intensity emitted by light emitting diode 66 increases and the photocoupling with phototransistor 45 produces an increase of collector-emitter conduction through phototransistor 45, a condition which causes the collector-emitter potential of phototransistor 45 to decrease and vice versa. Since the collector-emitter electrodes of phototransistor 45 are connected in shunt with charge circuit variable resistor 24, the equivalent resistance in the charge circuit of timing capacitor 25 of disenabling monostable multivibrator circuit 20 decreases with an increase of the potential level and increases with a decrease of the potential level of the direct current modulation signal. The relationship of these circuit elements, therefore, provides a varying disenabling or blanking pulse produced by disenabling monostable multivibrator circuit 20 with respect to time dependent upon the frequency of the later occurring signals of the repeating input signal pulse pairs. When the frequency of these pulses increases, the time period of the disenabling or blanking pulses decreases and when the frequency of these pulses decreases, the time period of the disenabling or blanking pulses increases. This relationship is shown by curve C of FIG. 2 which shows the disenabling output signal of disenabling monostable multivibrator circuit 20 to decrease in duration with increase of frequency of the later occurring input signal.

To calibrate the disenabling circuitry, a pulse of a known frequency, for example 20 hertz, is applied to input circuit terminals 2 and 4 simultaneously. At a frequency of 20 hertz, the period of time between pulses is $50 \times 10^{-3}$ seconds. The output signal appearing upon the output circuit of disenabling monostable multivibrator circuit 20, output terminal 3 of gate 22, is monitored with an oscilloscope and variable charge circuit resistor 24 is adjusted until the on time of the output disenabling pulse is of a predetermined portion of the period between input signal pulses. In a practical application of the circuit of this invention, variable charge circuit resistor 24 was adjusted until the duration of the disenabling signal pulse produced by disenabling monostable multivibrator 20 was 80 percent of the interval of time between the input signal pulses of $40 \times 10^{-3}$ seconds. The frequency of the input signal pulses is slowly increased and potentiometer 70 is adjusted until the disenabling pulse produced by disenabling monostable multivibrator circuit 20 begins to decrease. If the width of the disenabling pulse decreases too rapidly, potentiometer 70 must be decreased. The proper adjustment of the disenabling circuitry is realized when the input frequency is adjusted from minimum to maximum, for example 20 to 200 hertz, and the disenabling signal pulse produced by disenabling monostable multivibrator circuit 20 varies from 40 to 3.5 milliseconds.

With the logic 1 disenabling signal pulse maintained upon the input terminal of start signal monostable multivibrator circuit 30, input terminal 1 of gate 31, a logic 0 signal is maintained upon output terminal 3 of gate 31, consequently, timing capacitor remains charged for the duration of the disenabling signal. While timing capacitor 35 is charged, the potential upon junction 33 is of a positive polarity and of a magnitude greater than the trigger level of gate 32, consequently, this potential serves as a logic 1 input signal to both input terminals 1 and 2 of gate 32, a condition which maintains a logic 0 signal upon the output terminal of monostable multivibrator circuit 30. Therefore, regardless of any electrical transient or noise signals which may be applied to input circuit terminal 2, will be ineffective to affect the operation of the novel circuit of this invention. Consequently, the novel circuit of this invention is virtually immune to electrical transient or noise signals.

While a preferred emobodiment of the present invention has been shown and described, it will be obvious to those skilled in the art that various modifications and substitutions may be made without departing from the spirit of the invention which is to be limited only within the scope of the appended claims.

What is claimed is:

1. A circuit for producing an output signal during the period between repeating time displaced input signal pulse pairs comprising; first circuit means for producing a start output signal in response to each of the first occurring input signal pulses of said repeating input signal pulse pairs; second circuit means responsive to each of the later occurring input signal pulses of said repeating input signal pulse pairs for producing a stop output signal; output signal producing circuit means responsive to each of said start signals for initiating and to each of said stop signals for terminating the system direct current output signal; circuit means responsive to each of said stop signals for producing a series of constant pulse width output signal pulses; means responsive to said series of constant pulse width output signal pulses for producing a modulation signal of a direct current potential level proportional to the frequency of the later occurring input signal pulses of said repeating input signal pulse pairs; and means responsive to said modulation signal for disenabling said first circuit means during the period between successive first occurring input signal pulses of said repeating input signal pulse pairs.

2. A circuit for producing an output signal during the period between repeating time displaced input signal pulse pairs comprising; first circuit means for producing a start output signal in response to each of the first occurring input signal pulses of said repeating input signal pulse pairs; second circuit means responsive to each of the later occurring input signal pulses of said repeating input signal pulse pairs for producing a stop output signal; output signal producing circuit means responsive to each of said start signals for initiating and to each of said stop signals for terminating the system direct current output signal; circuit means responsive to each of said stop signals for producing a series of constant pulse width output signal pulses; means responsive to said series of constant pulse width output signal pulses for producing a modulation signal of a direct current potential level proportional to the frequency of the later occurring input signal pulses of said repeating input signal pairs; and means responsive to said modulation signal for disenabling said first circuit means during a predetermined portion of the period between successive first occurring input signal pulses of said repeating input signal pulse pairs.

3. A circuit for producing an output signal during the period between repeating time displaced input signal pulse pairs comprising; first circuit means for producing a start output signal in response to each of the first occurring input signal pulses of said repeating input signal pulse pairs; second circuit means responsive to each of the later occurring input signal pulses of said repeating input signal pulse pairs for producing a stop output signal; output signal producing circuit means responsive to each of said start signals for initiating and to each of said stop signals for terminating the system direct current output signal; circuit means responsive to each of said stop signals for producing a series of constant pulse width output signal pulses; a signal pulse averaging circuit responsive to said series of constant pulse width output signal pulses for producing a modulation signal of a direct current potential level proportional to the frequency of the later occurring input signal pulses of said repeating input signal pulse pairs; and means responsive to said modulation signal for disenabling said first circuit means during a predetermined portion of the period between successive first occurring input signal pulses of said repeating input signal pulse pairs.

4. A circuit for producing an output signal during the period between repeating time displaced input signal pulse pairs comprising; a first monostable multivibrator circuit for producing a start output signal in response to each of the first occurring input signal pulses of said repeating input signal pulse pairs; a second monostable multivibrator circuit responsive to each of the later occurring input signal pulses of said repeating input signal pulse pairs for producing a stop output signal; a bistable multivibrator circuit responsive to each of said start signals for initiating and to each of said stop signals for terminating the system direct current output signal; a third monostable multivibrator circuit responsive to each of said stop signals for producing a series of constant pulse width output signal pulses; a signal pulse averaging circuit responsive to said series of constant pulse width output signal pulses for producing a modulation signal of a direct current potential level proportional to the frequency of the later occurring input signal pulses of said repeating input signal pulse pairs; and means responsive to said modulation signal for disenabling said first circuit means during a predetermined portion of the period between successive first occurring input signal pulses of said repeating input signal pulse pairs.

5. A circuit for producing an output signal during the period between repeating time displaced input signal pulse pairs comprising; first circuit means for producing a start output signal in response to each of the first occurring input signal pulses of said repeating input signal pulse pairs; second circuit means responsive to each of the later occurring input signal pulses of said repeating input signal pulse pairs for producing a stop output signal; output signal producing circuit means responsive to each of said start signals for initiating and to each of said stop signals for terminating the system direct current output signal; circuit means responsive to each of said stop signals for producing a series of constant pulse width output signal pulses; a Pi section filter; means for applying said series of constant pulse width output signal pulses across said Pi section filter for producing an output modulation signal of a direct current potential level proportional to the frequency of the later occurring input signal pulses of said repeating input signal pulse pairs; and means responsive to said modulation signal for disenabling said first circuit means during the period between successive first occurring input signal pulses of said repeating input signal pulse pairs.

6. A circuit for producing an output signal during the period between repeating time displaced input signal pulse pairs comprising; first circuit means having an input circuit for producing a start output signal in response to each of the first occurring input signal pulses of said repeating input signal pulse pairs; second circuit means responsive to each of the later occurring input signal pulses of said repeating input signal pulse pairs for producing a stop output signal; output signal producing circuit means responsive to each of said start signals for initiating and to each of said signals for terminating the system direct current output signal; circuit means responsive to each of said stop signals for producing a series of constant pulse width output signal pulses; means responsive to said series of constant pulse width output signal pulses for producing a modulation signal of a direct current potential level proportional to the frequency of the later occurring input signal pulses of said repeating input signal pulse pairs; a light emitting diode; means for applying said modulation signal across said light diode; a disenabling monostable multivibrator circuit having input and output circuits and a timing capacitor of the type which is electrical pulse triggerable from a stable condition of operation to an alternate condition of operation and which, upon being triggered to the alternate condition of operation, spontaneously returns to the stable condition of operation at the conclusion of a period of time determined by the RC time constant of the charge circuit of the timing capacitor; means for applying the first occurring input signal pulses of said repeating input signal pulse pairs to said input circuit of said disenabling monostable multivibrator circuit; a photo transistor having collector and emitter electrodes photocoupled to said light emitting diode; means for connecting said collector-emitter electrodes of said phototransistor in series in the charge circuit of said timing capacitor of said monostable multivibrator circuit; and means for connecting said output circuit of said disenabling monostable multivibrator circuit to said input circuit of said first circuit means.

7. A circuit for producing an output signal during the period between repeating time displaced input signal pulse pairs comprising; first circuit means having an input circuit for producing a start output signal in response to each of the first occurring input signal pulses of said repeating input signal pulse pairs; second circuit means reponsive to each of the later occurring input signal pulses of said repeating input signal pulse pairs for producing a stop output signal; output signal producing circuit means responsive to each of said start signals for initiating and to each of said stop signals for terminating the system direct current output signal; circuit means responsive to each of said stop signals for producing a series of constant pulse width output signal pulses; a signal pulse averaging circuit; means for applying said series of constant pulse width output signal pulses across said signal pulse averaging circuit for producing an output modulation signal of a direct current potential level proportional to the frequency of the later occurring input signal pulses of said repeating input signal pulse pairs; a light emitting diode; means for applying said output modulation signal of said signal pulse averaging circuit across said light emitting diode; a disenabling monostable multivibrator circuit having input and output circuits and a timing capacitor of the type which is electrical pulse triggerable from a stable condition of operation to an alternate condition of operation and which, upon being triggered to the alternate condition of operation, spontaneously returns to the stable condition of operation at the conclusion of a period of time determined by the RC time constant of the charge circuit of the timing capacitor; means for applying the first occurring input signal pulses of said repeating input signal pulse pairs to said input circuit of said disenabling monostable multivibrator circuit; a phototransistor having collector and emitter electrodes photocoupled to said light emitting diode; means for connecting said collector-emitter electrodes of said phototransistor in series in the charge circuit of said timing capacitor of said monostable multivibrator circuit; and means for connecting said output circuit of said disenabling monostable multivibrator circuit to said input circuit of said frst circuit means.

8. A circuit for producing an output signal during the period between repeating time displaced input signal pulse pairs comprising; a first monostable multivibrator circuit having an input circuit for producing a start output signal in response to each of the first occurring input signal pulses of said repeating input signal pulse pairs; a second monostable multivibrator circuit responsive to each of the later occurring input signal pulses of said repeating input signal pulse pairs for producing a stop output signal; a bistable multivibrator circuit responsive to each of said start signals for initiating and to each of said stop signals for terminating the system direct current output signal; a third monostable multivibrator circuit responsive to each of said stop signals for producing a series of constant pulse width output signal pulses; a Pi section filter; means for applying said series of constant pulse width output signal pulses across said Pi section filter for producing an output modulation signal of a direct current potential level proportional to the frequency of the later occurring input signal pulses of said repeating input signal pulse pairs; a light emitting diode; means for applying said output modulation signal of said Pi section filter across said light emitting diode; a disenabling monostable multivibrator circuit having input and output circuits and a timing capacitor of the type which is electrical pulse triggerable from a stable condition of operation to an alternate condition of operation and which, upon being triggered to the alternate condition of operation, spontaneously returns to the stable condition of operation at the conclusion of a period of time determined by the RC time constant of the charge circuit of the timing capacitor; means for applying the first occurring input signal pulses of said repeating input signal pulse pairs to said input circuit of said disenabling monostable multivibrator circuit; a phototransistor having collector and emitter electrodes photocoupled to said light emitting diode; means for connecting said collector-emitter electrodes of said phototransistor in series in the charge circuit of said timing capacitor of said disenabling monostable multivibrator circuit; and means for connecting said output circuit of said disenabling monostable multivibrator circuit to said input circuit of said first monostable multivibrator circuit.

* * * * *

UNITED STATES PATENT AND TRADEMARK OFFICE

CERTIFICATE OF CORRECTION

PATENT NO. : 3,904,894

DATED : September 9, 1975

INVENTOR(S) : Henry J. Ciolli

It is certified that error appears in the above-identified patent and that said Letters Patent are hereby corrected as shown below:

Col. 1, line 34, "pairs" should read -- pulses --.
Col. 2, line 39, before "input" change "in" to -- an --.
Col. 4, line 11, after "terminal" change "2" to -- 3 --;
line 32, "pulse" should read -- pulses --.
Col. 5, line 49, after "logic 1" insert -- stop --.
Col. 7, line 55, enclose "on" in quotation marks -- "on" --;
line 62, after "pulses" change "of" to -- or --.
Col. 8, line 25, "emobodiment" should read -- embodiment --.
Col. 9, line 6, after "signal" insert -- pulse --.
Col. 10, line 27, after "said" insert -- stop --;
line 37, after "light" insert -- emitting --.
Col. 11, line 33, "frst" should read -- first --.

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*